United States Patent [19]

Emery et al.

[11] Patent Number: 4,727,621

[45] Date of Patent: Mar. 1, 1988

[54] MULTIPOSITION HINGE

[75] Inventors: Donald D. Emery, 3645 Bellows Dr., Troy, Mich. 48083; David C. Stewart, 22100 W. Brandon, Farmington Hills, Mich. 48024; Geoffrey Waterworth, 5256 Edgelake Rd., P.O. Box 36, Lakeland, Mich. 48143

[73] Assignee: General Motors Corporation, Detroit, Mich.

[21] Appl. No.: 932,326

[22] Filed: Nov. 19, 1986

[51] Int. Cl.[4] ........................ E05D 7/06; E05D 11/10; E05D 11/06; B62D 25/10

[52] U.S. Cl. ........................................ 16/239; 16/343; 16/371; 180/69.21

[58] Field of Search ................. 16/239, 240, 241, 245, 16/366, 387, DIG. 39, 370; 296/146; 49/400; 180/69.21

[56] References Cited

U.S. PATENT DOCUMENTS 4,382,312 5/1983 Liggett et al. .................. 180/69.21

FOREIGN PATENT DOCUMENTS 3515099 10/1986 Fed. Rep. of Germany ... 180/69.21

*Primary Examiner*—Nicholas P. Godici
*Assistant Examiner*—Edward Brown
*Attorney, Agent, or Firm*—Herbert Furman

[57] ABSTRACT

A multiposition hood hinge for an alligator type hood includes body mounted and hood mounted hinge members which are respectively pivoted to the forward and rearward ends of an intermediate link. An intermediate portion of the link is releasably secured to the body mounted hinge member. The hood mounted hinge member normally pivots about the rearward end of the link. Upon release of the intermediate portion of the link from the body mounted hinge member, the hinge can be moved to various open positions.

4 Claims, 5 Drawing Figures

MULTIPOSITION HINGE

This invention relates generally to multiposition hinges for vehicle closures and more particularly to a multiposition hood hinge for mounting an alligator type vehicle hood to the vehicle.

Alligator type vehicle hoods are well known in the automotive industry. Such hoods have certain advantages over other type hoods but also have a disadvantage of limiting access to the front compartment of the vehicle for service of the engine and other components located therein. Another disadvantage is that the hood blocks complete access to the windshield opening whenever it is necessary to obtain access to the windshield opening for removal or installation of the windshield. A further disadvantage is that such hinges do not permit initial adjustment of the hood within the opening of the front compartment of the vehicle and subsequent fixing of the hood in the adjusted position.

Multiposition hood hinges are known. Reference may be had to U.S. Pat. No. 4,382,312, (Liggett et al), Multiposition Hood Hinge Mechanism, assigned to the assignee of this invention for disclosure of such a hood hinge.

The hood hinge of this invention has a minimum number of basic components and includes only a vehicle mounted hinge member, a hood mounted hinge member, and a link. The forward end of the link is pivoted to the vehicle mounted hinge member and the rearward end of the link is pivoted to the hood mounted hinge member. An intermediate portion of the link is releasably secured by a fastener to the vehicle mounted hinge member. Normally, the hood and hood mounted hinge member pivot as a unit about the rearward end of the link as the hood moves between closed and first open positions. A check strap sets the first open position. If it is desired to move the hood to a slightly increased second open position, the fastener securing the link is removed, the link slightly pivoted about the vehicle mounted second hinge member, the fastener replaced, and the link seated on the fastener. If it is desired to move the hood to additional open positions, either vertically of its second open position or generally horizontally forwardly of the closed position, the fastener is removed and the hood is pivoted relative to the link as the link pivots relative to its forward pivot to the vehicle mounted hinge member. A check strap connects the vehicle mounted and hood mounted hinge members. Removal of one end of the strap is necessary to permit movement of the hood to various open positions.

The releasable securement of the link to the vehicle mounted hinge member includes the fastener, washer on the fastener, an enlarged opening in the link and a tapped opening in the vehicle mounted hinge member. The fastener is threaded into the tapped opening before the hood is adjusted to the desired horizontal and vertical positions within the hood opening to set the pivotal position of the link relative to the vehicle mounted hinge member. The washer is then welded or otherwise fixed to the link to fix the position of the link. After desired removal of the bolt to obtain various open positions of the hood relative to the front compartment, the hood will always return to the same position within the hood opening since the position of the link relative to the vehicle mounted hinge member remains the same.

The primary feature of this invention is that it provides a multiposition hinge for alligator type vehicle hoods which permits the hood to be opened to various open positions and to always be returned to its initially set closed position. Another feature is that the hinge is comprised of a minimum number of parts and permits initial setting of the closed position of the hood at the time of manufacture of the vehicle and return of the hood to this position after movement of the hood to any of the open positions.

These and other features will be readily apparent from the following specification and drawings wherein.

Figure 1:
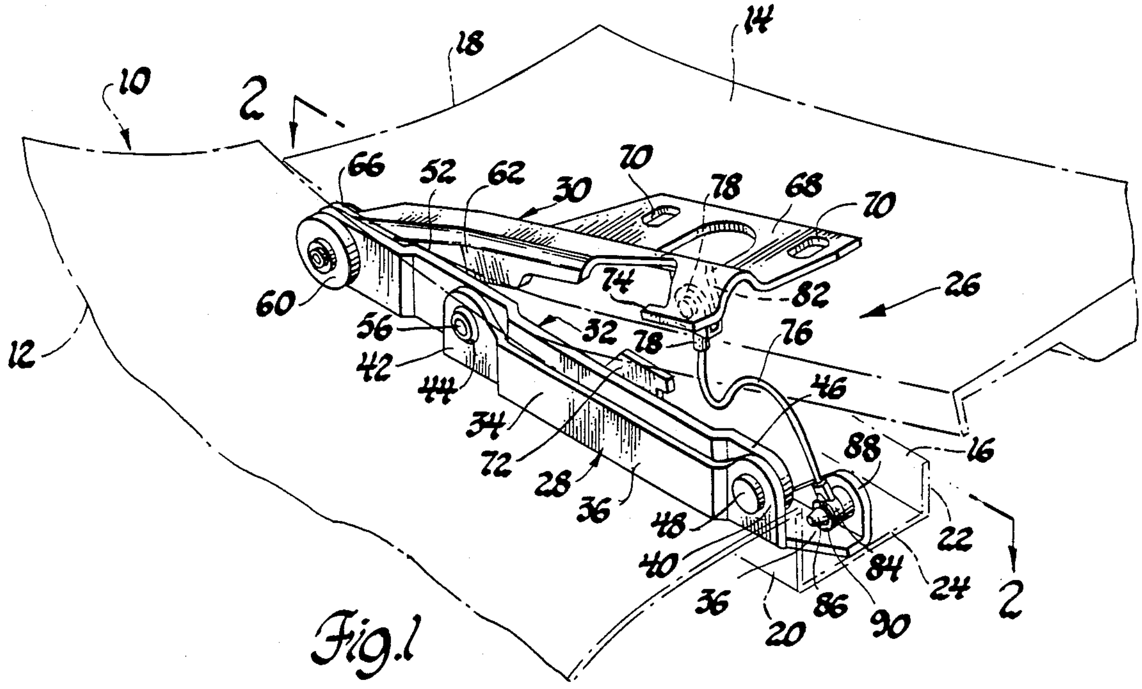
FIG. 1 is a perspective view of a righthand hood hinge according to this invention with portions of the body and hood shown in phantom lines, and the hood shown in a partially open position.

Since alligator type hoods are well known, such hoods and the attendant body structure are not shown in detail in the drawings. Generally, as shown in FIG. 1 in dash lines, a vehicle designated generally 10 includes a righthand front fender 12 and a hood 14 which opens and closes a forward or engine compartment 16 of the body. The sides of the engine compartment are defined by the righthand front fender 12 and a lefthand front fender, not shown, and front body structure. The cowl or dash panel structure, not shown, adjacent the rearward edge 18 of hood 14 defines the rear side of compartment 16, and the front radiator support structure, not shown, defines the forward side. The front body structure includes outboard and inboard flanges 20 and 22 and a base flange 24.

The hood 14 is mounted to the vehicle 10 by righthand, as shown, and lefthand, not shown, hood hinges 26 according to this invention. A hinge 26 is provided on each side of the compartment 16 adjacent the rearward wall thereof. Since the hinges 26 are the same, although of different hand, only the righthand hinge is shown in detail and it will be understood that the lefthand hinge is the same.

Figure 2:
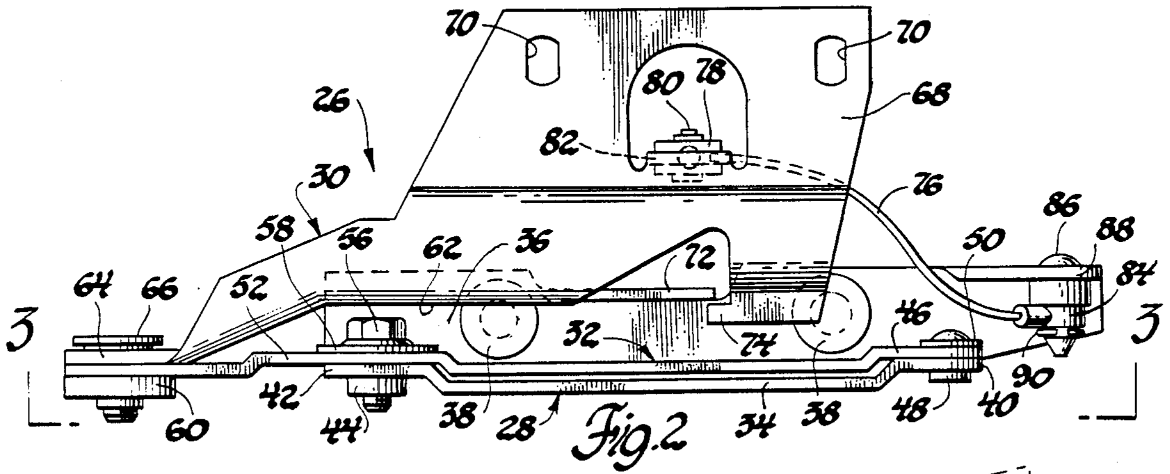
FIG. 2 is an enlarged view taken along line 2—2 of FIG. 1.
Figure 3:
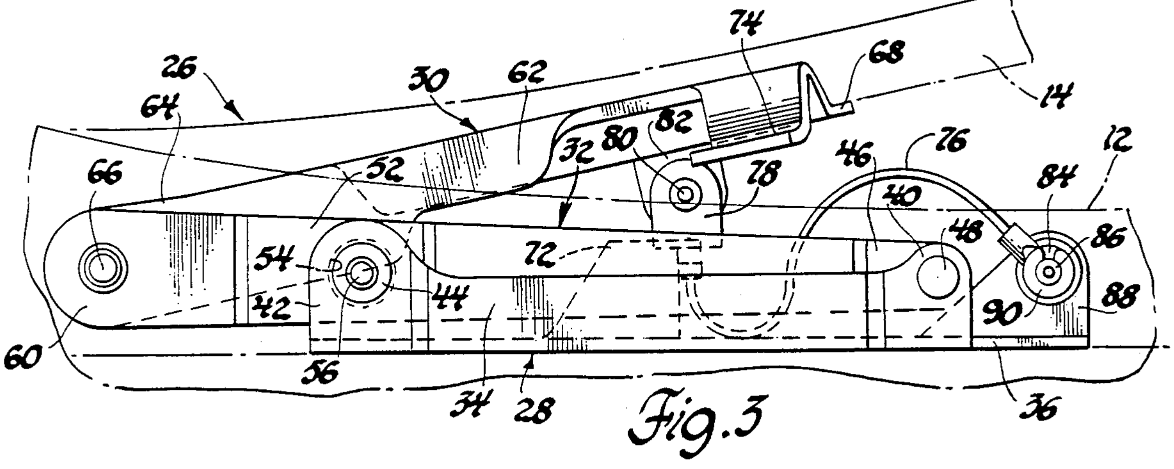
FIG. 3 is a view taken along line 3—3 of FIG. 2.

The hinge 26 includes a vehicle mounted hinge member 28, a hood mounted hinge member 30 and a link 32 which interconnects the hinge members. The hinge member 28 includes an outboard wall or flange 34 and a base wall or flange 36. The flange 36 seats against the flange 24 of the front body structure 18 and is secured thereto at 38, FIG. 2, to mount hinge 26 to vehicle 10. The flange 34 is located adjacent flange 20 and includes a forward inboard offset apertured ear 40 and a rearward inboard offset ear 42 provided with a tapped embossment 44. The link 32 has a forward inboard offset apertured end 46 which nests against ear 40 and is pivoted thereto by a rivet 48 headed over a washer 50. An intermediate portion 52 of the link 32 is offset inboard and provided with an enlarged circular opening 54. A bolt 56 mounting a washer 58 extends through the opening 54 and is threaded into the embossment 44 to removably secure the link to hinge member 28. It will be noted that the portion of the link 32 between the opening 54 and the forward end 46 nestles within the wall 34 of hinge member 28 as shown in FIGS. 2 and 3. The rearward end of the link 32 is apertured and mounts a tapped washer 60 which is aligned with the aperture therein.

Figure 5:
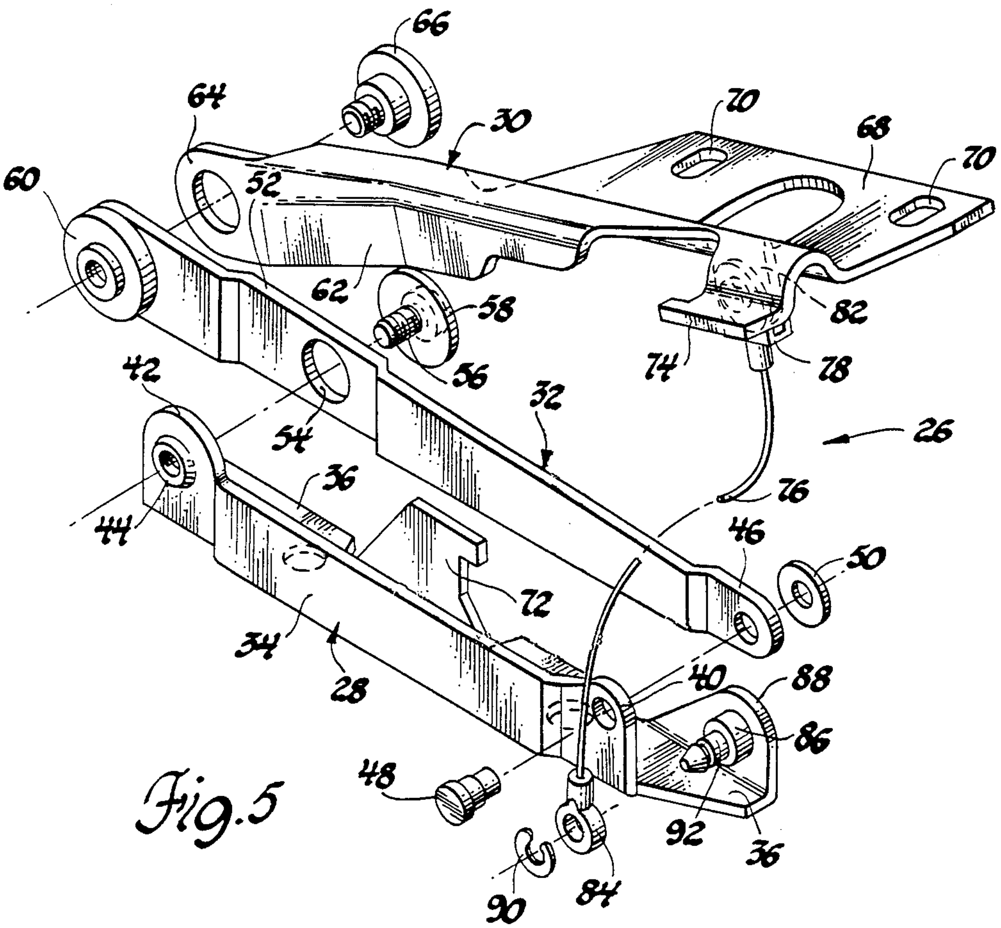
FIG. 5 is a blown apart perspective view.

The hood mounted hinge member 30 is of a generally U-shape. The outboard wall 62 of member 30 is provided with an integral apertured ear 64. A shouldered stud 66 fits within the opening of ear 64 and is threaded into the washer 60 to pivotally mount the hinge member 30 to the link 32. The hinge member 30 includes a flange 68 which is provided with enlarged openings 70 so as to adjustably mount the righthand rear corner portion of the vehicle hood 14. As best shown in FIG. 5, the hinge member 28 includes an integral inboard vertically extending hook shaped ear 72, and the outboard wall 62 of the hinge member 30 includes a horizontally extending hook shaped ear 74. These ears are located in adjacent facing relationship when the hood is in closed position with hinge member 30 generally aligned with hinge member 28. The purpose of the ears is to prevent rearward displacement of the hood 14 in the event of a frontal impact thereagainst.

A check strap 76 has its upper end secured to an apertured clevis 78 which is pivoted at 80 to a lanced downwardly extending ear 82 of the hinge member 30. The lower end of the check strap is secured to a fitting 84 which is received over a stud 86 secured to a forward upwardly extending inboard ear 88 of the hinge member 28. The fitting 84 is releasably secured to the stud 86 by a C washer 90 snapped within a peripheral groove 92 of the stud 86.

The hinge member 30 is releasably secured to the rear corner righthand side of the hood by suitable fasteners extending through the openings 70 into the hood reinforcement panels. The hinge member 30 is accurately fixtured with respect to the side and rear edges of the hood before being secured thereto. The opening of ear 64 is pierced after such fixturing and secured to link 32 by bolt 66 and washer 60. The hinge member 28 is preassembled to link 32 and secured to the flange 24 by bolts 38 prior to securement of hinge member 30 to link 32. The bolt 56 extends through opening 54 and is threaded into the embossment 44. The bolt is partially tightened.

The hood is then adjusted within the opening of the front compartment 16 as link 32 pivots about rivet 48 and opening 54 shifts relative to bolt 56. After such adjustment, the bolt 56 is tightened to clamp washer 58 against the intermediate portion 52 of the link 32 and clamp portion 52 against the ear 42 as shown in FIGS. 2 and 3. The washer 58 is then welded or otherwise fixed to the link 32 so that the rotative position of the link about the pivot 48 is fixed.

Figure 4:
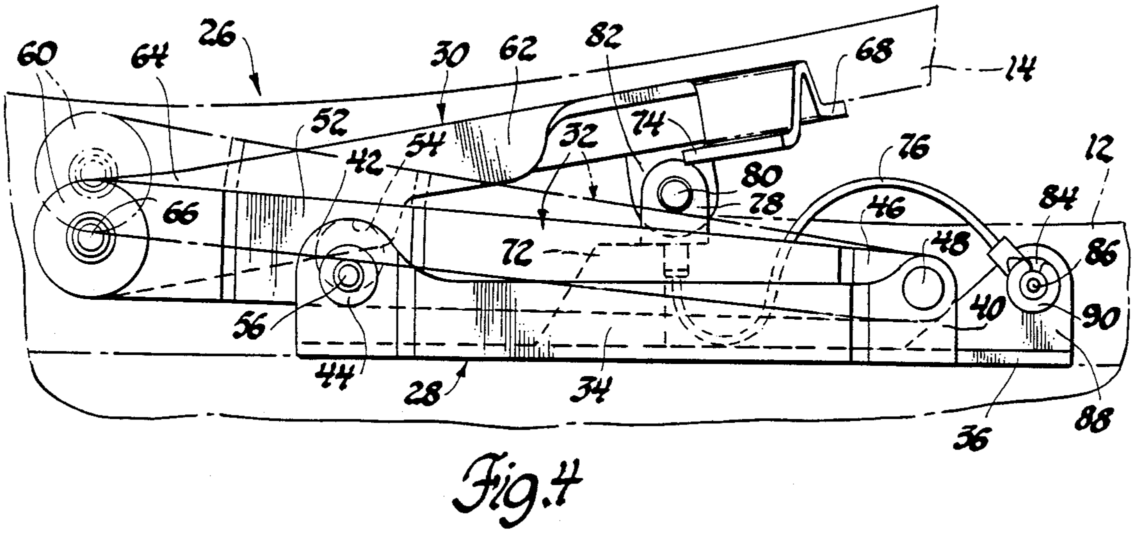
FIG. 4 is a view similar to FIG. 3 showing the hinge in an additional open position.

The hood 14 can thereafter be moved between a closed position within the opening 16 and a first open position which is set by the length of the check strap 76 as the hood and the hinge member 30 pivot about the stud 66. In the closed position, the hinge members 28 and 30 are generally aligned with each other and with link 32. Should additional space be necessary between the rearward edge of the hood and the adjacent windshield, the bolt 56 can be unthreaded from the embossment 44, the link 32 slightly rotated clockwise, the bolt 56 rethreaded into the embossment 44, and the link thereafter rested on the stud as shown in phantom line in FIG. 4 to locate the hood in a second open position.

Should additional access to the windshield and/or compartment 16 be desired, the bolt 56 is unthreaded from the embossment 44 and the fitting 84 released from stud 86. The link 32 is then rotated forwardly of the vehicle or approximately 180° clockwise as viewed in the drawings so that it extends to the right at rivet 48 rather than to the left, and the hood swung counterclockwise about the stud 66. This will displace the hood horizontally forwardly of the compartment 16 to a third open position and provide complete access to both the windshield opening of the vehicle and the rearward portion of the compartment 16. The hood can also be located in other open positions, intermediate closed and third open positions by rotating link 32 about rivet 48 and rotating the hood 14 and hinge member 30 about stud 66. The hood will have to be supported in each of these positions.

Upon return of the hood to the closed position from each of the open positions, threading of the bolt 56 within the embossment 44 releasably secures the link 32 to the hinge member 28 and locates the hood in the desired closed position. The fitting 84 of the check strap 76 is released from the stud 86 before the hood is moved to the third open position and the open positions intermediate the closed position and the third open position through removal of the C clip 90 from the groove 92. The fitting 84 is secured to stud 86 before the hood is returned to closed position.

Thus this invention provides an improved multiposition hinge for mounting an alligator type hood to a vehicle body.

The embodiments of the invention in which an exclusive property or privilege is claimed are defined as follows:

1. A multiposition hinge for mounting a closure to a vehicle for movement between a closed position and multiple open positions comprising, in combination,
   a vehicle mounted first hinge member having a first pivot opening and a second pivot opening,
   a link member having a first pivot opening, a second pivot opening, and a third pivot opening, the first and second pivot openings of the first hinge member and the link member corresponding to each other,
   first pivot means rotatably securing the corresponding first pivot openings of the first hinge member and link member to each other,
   a closure mounted second hinge member having a pivot opening corresponding to the third pivot opening of the link member,
   second pivot means rotatably securing the corresponding pivot openings of the link member and second hinge member to each other,
   and removable fastener means extending through the corresponding second openings to secure the link member to the first hinge member,
   the second hinge member being rotatable about the second pivot means to move such hinge member and a closure mounted thereto between closed and first open positions,
   removal of the fastener means permitting the link member to rotate about the first pivot means individually or conjointly with rotation of the closure mounted hinge member about the second pivot means to move the closure between the closed position and other open positions.

2. A multiposition hinge for mounting a closure to a vehicle for movement between a closed position and multiple open positions comprising, in combination,
   a vehicle mounted first hinge member having a first pivot opening and a second pivot opening,
   a link member having a first pivot opening, a second pivot opening, and a third pivot opening, the first and second pivot openings of the first hinge member and the link member corresponding to each other, first pivot means rotatably securing the corresponding first pivot openings of the first hinge member and link member to each other, a closure mounted second hinge member having a pivot opening corresponding to the third pivot opening of the link member, second pivot means rotatably securing the corresponding pivot openings of the link member and second hinge member to each other, and removable fastener means extending through the corresponding second openings and securing the link member and first hinge member to each other, one of the corresponding second openings being larger than the fastener means to permit rotation of the link member about the first pivot means and setting of the rotative position of the second pivot means relative to the first pivot means before the fastener means secures the link member and first hinge member to each other, the second hinge member being rotatable about the second pivot means to move such hinge member and a closure mounted thereto between closed and first open positions, removal of the fastener means permitting the link member to rotate about the first pivot means individually or conjointly with rotation of the closure mounted hinge member about the second pivot means to move the closure between the closed position and other open positions.

3. A multiposition hinge for mounting a closure to a vehicle for movement between a closed position and multiple open positions comprising, in combination, a vehicle mounted first hinge member having a first pivot opening and a second pivot opening, a link member having a first pivot opening, a second pivot opening, and a third pivot opening, the first and second pivot openings of the first hinge member and the link member corresponding to each other, first pivot means rotatably securing the corresponding first pivot openings of the first hinge member and link member to each other, a closure mounted second hinge member having a pivot opening corresponding to the third pivot opening of the link member, second pivot means rotatably securing the corresponding pivot openings of the link member and second hinge member to each other, apertured washer means located along the side of one of the corresponding second openings, and fastener means extending through the aperture of the washer means and the corresponding second openings, the fastener means being of smaller size than the one corresponding second opening and of the approximate size of the aperture in the washer means, the fastener means being securable within the other corresponding second opening to secure the link member and first hinge member to each other, the link member being rotatable about the first pivot means to set the rotative position of the second pivot means relative to the first pivot means as the fastener means moves within the one corresponding second opening, the washer means being fixed to the member having the one corresponding second opening after such position is set, the second hinge member being rotatable about the second pivot means to move such hinge member and a closure mounted thereto between closed and first open positions, removal of the fastener means permitting the link member to rotate about the first pivot means individually or conjointly with rotation of the closure mounted hinge member about the second pivot means to move the closure between the closed position and other open positions.

4. A multiposition hinge for mounting a closure to a vehicle for movement between a closed position and multiple open positions comprising, in combination, a vehicle mounted first hinge member having a first pivot opening and a second tapped pivot opening, a link member having a first pivot opening, a second pivot opening, and a third pivot opening, first pivot means rotatably securing the corresponding first pivot openings of the first hinge member and link member to each other, a closure mounted second hinge member having a pivot opening corresponding to the third pivot opening of the link member, second pivot means rotatably securing the corresponding pivot openings of the link member and second hinge member to each other, apertured washer means located over the second opening of the link member, and threaded fastener means extending through the aperture of the washer means and the second opening of the link member and being threaded into the second opening of the first hinge member to secure the link member and first hinge member to each other, the fastener means being of smaller size than the second opening of the link member and of the approximate size of the aperture in the washer means, the link member being rotatable about the first pivot means to set the rotative position of the second pivot means relative to the first pivot means as the fastener means moves within the second opening of the link member, the washer means being fixed to the link member after such position is set, the second hinge member being rotatable about the second pivot means to move such hinge member and a closure mounted thereto between closed and first open positions, removal of the fastener means permitting the link member to rotate about the first pivot means individually or conjointly with rotation of the closure mounted hinge member about the second pivot means to move the closure between the closed position and other open positions.

* * * * *